(12) United States Patent
Ellis et al.

(10) Patent No.: US 10,612,901 B2
(45) Date of Patent: Apr. 7, 2020

(54) REAL-TIME COMPENSATION OF INERTIAL GYROSCOPES

(71) Applicant: Simmonds Precision Products, Inc., Vergennes, VT (US)

(72) Inventors: David Ellis, Plymouth, MN (US); Todd Anthony Ell, Savage, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 265 days.

(21) Appl. No.: 15/934,658

(22) Filed: Mar. 23, 2018

(65) Prior Publication Data
US 2019/0293396 A1     Sep. 26, 2019

(51) Int. Cl.
| | |
|---|---|
| *F42B 15/01* | (2006.01) |
| *B64G 1/36* | (2006.01) |
| *G01C 21/02* | (2006.01) |
| *G01C 21/00* | (2006.01) |
| *B64G 1/28* | (2006.01) |
| *G01C 21/16* | (2006.01) |
| *G05D 1/10* | (2006.01) |
| *G01C 19/02* | (2006.01) |
| *F42B 15/00* | (2006.01) |
| *G01C 19/00* | (2013.01) |

(52) U.S. Cl.
CPC ............. *F42B 15/01* (2013.01); *B64G 1/28* (2013.01); *B64G 1/36* (2013.01); *G01C 19/025* (2013.01); *G01C 21/005* (2013.01); *G01C 21/025* (2013.01); *G01C 21/165* (2013.01); *G05D 1/108* (2013.01)

(58) Field of Classification Search
None
See application file for complete search history.

(56) References Cited

U.S. PATENT DOCUMENTS

| | | | | |
|---|---|---|---|---|
| 3,305,671 | A | | 2/1967 | Manoni, Jr. |
| 5,062,051 | A | * | 10/1991 | Sainct ............. B64G 1/365 |
| | | | | 244/171 |
| 5,562,266 | A | * | 10/1996 | Achkar ............ B64G 1/361 |
| | | | | 244/171 |
| 6,108,594 | A | * | 8/2000 | Didinsky ......... B64G 1/361 |
| | | | | 701/13 |

(Continued)

OTHER PUBLICATIONS

Extended European Search Report for European Patent Application No. 19162977.3, dated Jul. 29, 2019, 9 pages.

*Primary Examiner* — Bernarr E Gregory
(74) *Attorney, Agent, or Firm* — Kinney & Lange, P.A.

(57) ABSTRACT

A real-time compensation system of a projectile includes at least one flight controller, at least one imager device, at least one gyroscope, and at least one processor. The at least one flight controller is configured to rotate the projectile about an axis between a first orientation and a second orientation. The at least one imager device is configured to capture a first image at the first orientation and a second image at the second orientation. The at least one gyroscope is configured to sense a first angular rate of the projectile as the projectile rotates from the first orientation to the second orientation. The at least one processor is configured to determine a first rotation angle based upon the first and second images and a second rotation angle based upon the angular rate sensed by the at least one gyroscope, and determine a gyroscope compensation parameter.

20 Claims, 4 Drawing Sheets

(56) References Cited

U.S. PATENT DOCUMENTS

| | | | | |
|---|---|---|---|---|
| 6,272,432 B1* | 8/2001 | Li | ............................ | B64G 1/288 |
| | | | | 701/501 |
| 6,298,288 B1* | 10/2001 | Li | ............................ | B64G 1/288 |
| | | | | 701/13 |
| 8,095,250 B2 | 1/2012 | Hanson et al. | | |
| 8,566,055 B1 | 10/2013 | Vidmar et al. | | |
| 8,655,511 B2 | 2/2014 | Revol et al. | | |
| 8,694,051 B2* | 4/2014 | Kulik | ..................... | G01C 25/005 |
| | | | | 455/556.1 |
| 9,073,648 B2* | 7/2015 | Tsao | .......................... | B64G 1/36 |
| 9,689,684 B2 | 6/2017 | Sheard et al. | | |
| 9,842,254 B1* | 12/2017 | Brailovskiy | ........... | H04N 5/2258 |
| 9,860,447 B1* | 1/2018 | Beard | ................... | H04N 5/2257 |
| 2004/0098178 A1 | 5/2004 | Brady et al. | | |
| 2014/0104445 A1* | 4/2014 | Ramachandran | ........ | G01C 25/00 |
| | | | | 348/208.2 |
| 2014/0372063 A1 | 12/2014 | Niu et al. | | |

\* cited by examiner

FIG. 4

REAL-TIME COMPENSATION OF INERTIAL GYROSCOPES

BACKGROUND

Precision guided munitions require accurate estimates of attitude to hit a designated target. Current weapon systems rely on the global positioning system (GPS), high cost inertial measurement units (IMUs), and/or a constant rolling airframe to achieve system navigation requirements. The new paradigm for precision guided munitions is GPS-denied, low cost and low volume IMUs, and maximum airframe performance.

SUMMARY

In one example, a real-time compensation system of a projectile comprises at least one flight controller, at least one imager device, at least one gyroscope, and at least one processor. The at least one flight controller is configured to rotate the projectile about an axis from a first orientation to a second orientation. The at least one imager device is configured to capture a first image at the first orientation and a second image at the second orientation. The at least one gyroscope is configured to sense a first angular rate of the projectile as the projectile rotates from the first orientation to the second orientation. The at least one processor is configured to detect a feature in the first image, determine a first rotation angle based upon the relative position of the feature in the first and second images, determine a second rotation angle based upon the angular rate sensed by the at least one gyroscope, and determine a gyroscope compensation parameter based upon the first and second rotation angle.

In one example, a method comprises rotating a projectile about an axis from a first orientation to a second orientation using a flight controller; capturing a first image at the first orientation using an imager device of the projectile; detecting a feature in the first image using a processor; capturing a second image at the second orientation using the imager device; determining a first rotation angle based upon a relative position of the feature in the first and second images using a processor; sensing a first angular rate using at least one gyroscope while the projectile rotates from the first orientation to the second orientation; determining a second rotation angle based upon the angular rate sensed by the at least one gyroscope; and determining a gyroscope compensation parameter for the at least one gyroscope based upon the first and second rotation angle.

In one example, a method of in-flight calibration for a projectile comprises rotating the projectile between at least a first orientation and a second orientation about at least one axis; capturing a plurality of images of a field of view of an imager device on board the projectile during the rotating including at least a first image taken at the first orientation and a second image taken at the second orientation; measuring a measured angle between the first image and the second image; monitoring an angular rate of the projectile with at least one gyroscope during the rotating; calculating a calculated angle between the first orientation and the second orientation with data monitored by the at least one gyroscope; and calibrating data monitored by the at least one gyroscope based on differences between the calculated angle and the measured angle.

DETAILED DESCRIPTION

Apparatus, systems, and associated methods relate to real-time compensation of inertial gyroscopes. Using the apparatus, systems, and associated methods herein, allows for adjusting gyroscope compensation parameters in projectiles without using GPS. Additionally, this allows for the use of lower cost IMUs that have large error shifts post launch.

Figure 1:
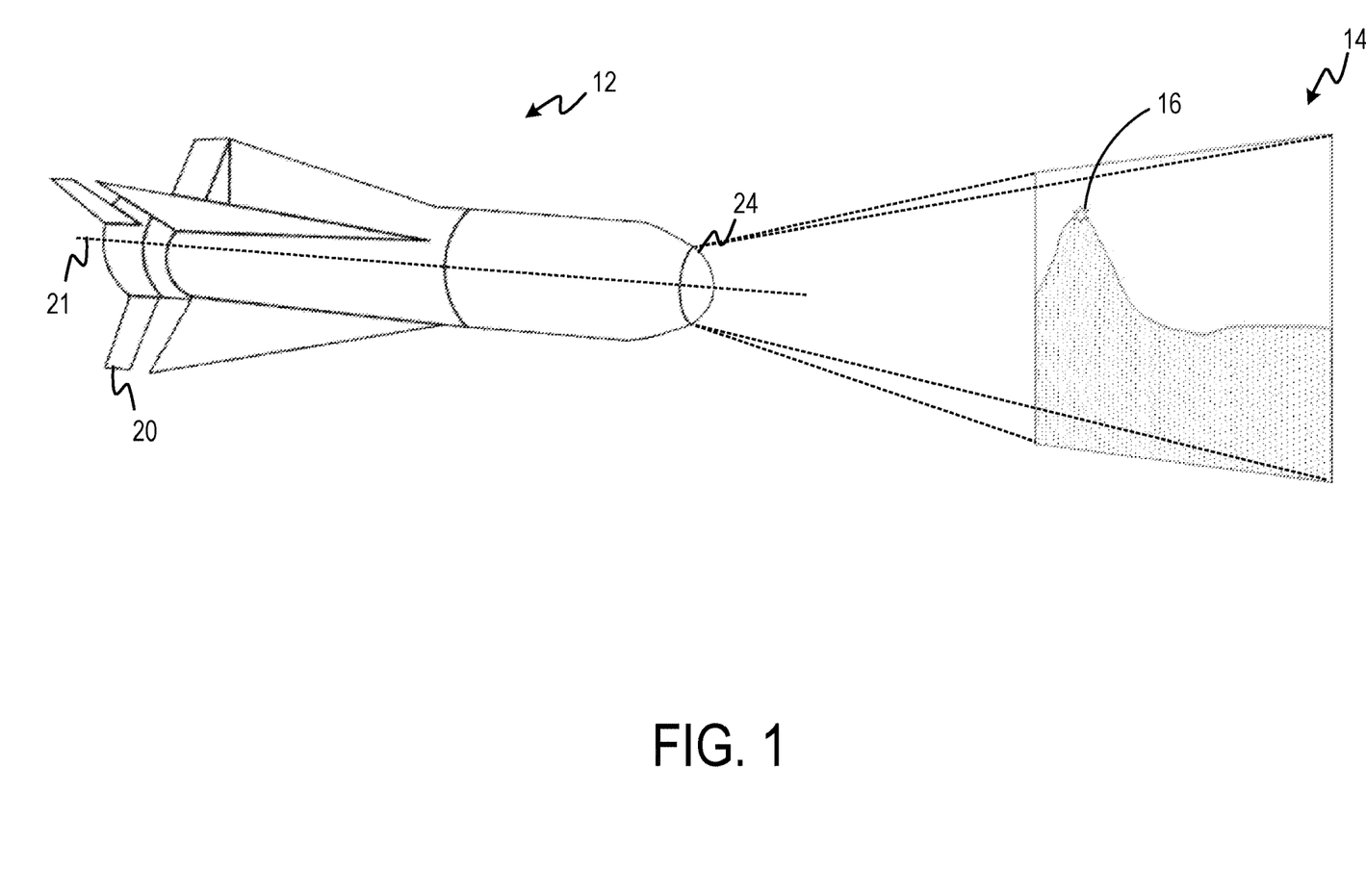
FIG. 1 is a perspective view of a projectile.

FIG. 1 is a perspective view of projectile 12 capturing an image 14. Image 14 includes feature of interest 16. Projectile 12 includes flight controller 20, imager device 24, and $X_{body}$ axis 21.

Projectile 12 as shown is a seeker missile. Projectile 12 can be a mortar, an aircraft, a drone, a guided missile, or other projectile that uses inertial measurement data for flight. Projectile 12 includes flight controller 20. Flight controller 20 includes fins or other flight control surfaces, as well as electrical and mechanical components such as servos to control the flight control surfaces. Flight controller 20 is configured to control the flight path of projectile 12 using flight control surfaces.

Imager device 24 can be any image capturing device configured to capture image data (e.g., visible spectrum image data, infrared spectrum image data, or other image data) of image 14 at an image capture frequency sufficient to enable visual tracking and guidance of projectile 12 to intercept an identified target, such as 10 Hertz (Hz), 20 Hz, or other image capture frequencies. Image 14 is a field of view image captured by imager device 24. Image 14 includes feature of interest 16 which can include, among others, lines, curves, intersections of lines, or other scale-invariant landmark image features. In image 14 as shown, feature of interest 16 is a peak of the horizon. The field of view of imager device 24 is aligned with the $X_{body}$ axis 21 of projectile 24.

Figure 2:
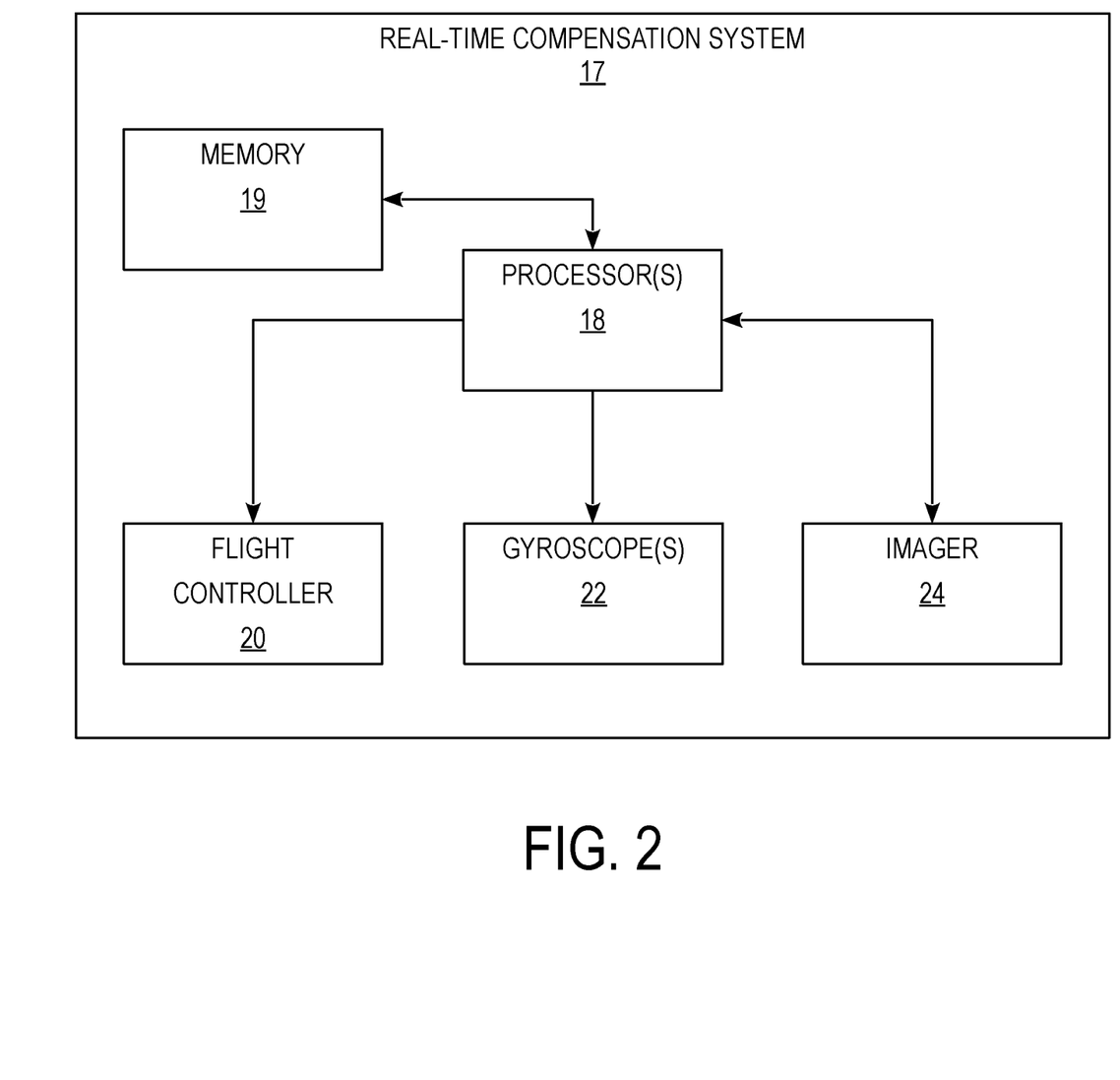
FIG. 2 is a block diagram of a real-time compensation system.

FIG. 2 is a block diagram of a real-time compensation system 17 of projectile 12. Real-time compensation system 17 includes processor(s) 18, memory 19, flight controller 20, gyroscope(s) 22, and imager device 24.

Memory 19, flight controller 20, gyroscope(s) 22, and imager device 24 are each operatively coupled (e.g., electrically and/or communicatively coupled) with processor(s) 18. Processor(s) 18 is configured to receive image data from imager 24. Processor(s) 18 identifies a feature of interest in the image data and tracks it through successive images to determine rotation angle. Processor(s) 18 is configured to receive a sensed angular rate from gyroscope(s) 22. Gyroscope(s) 22 is configured to sense angular rate along one of the three mutually-orthogonal axes of projectile 12. In some examples, gyroscope(s) 22 comprises three gyroscopes, one for each of the three mutually-orthogonal axes, axes ($X_{body}$, $Y_{body}$, and $Z_{body}$), of projectile 12.

In one example, gyroscope(s) 22 is part of an inertial measurement unit (IMU). Processor(s) 18 is configured to adjust sensed angular rates of gyroscope(s) 22 based upon compensation parameters. Compensation parameters include bias, scale factor, noise filter, and/or other error compensation parameters. These compensation parameters are determined by rotating about an axis ($X_{body}$, $Y_{body}$, or $Z_{body}$) and determining a first orientation of rotation using images captured by imager device 24, determining a second orientation of rotation from the sensed angular rate from gyroscope(s) 20, and using a least-squares methodology with the first and second orientations as inputs. Processor(s) 18 is configured to provide flight instructions to flight controller 20 for controlling the flight path of projectile 12. Flight controller 20 is configured to adjust the flight control surfaces of projectile 12 based upon the instructions.

Processor(s) 18 is configured to execute instructions and store data in memory 19. Memory 19 of real-time compensation system 17 can be configured to store information within real-time compensation system 17 during operation. The memory 17 can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Memory 17 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories.

Figure 3:
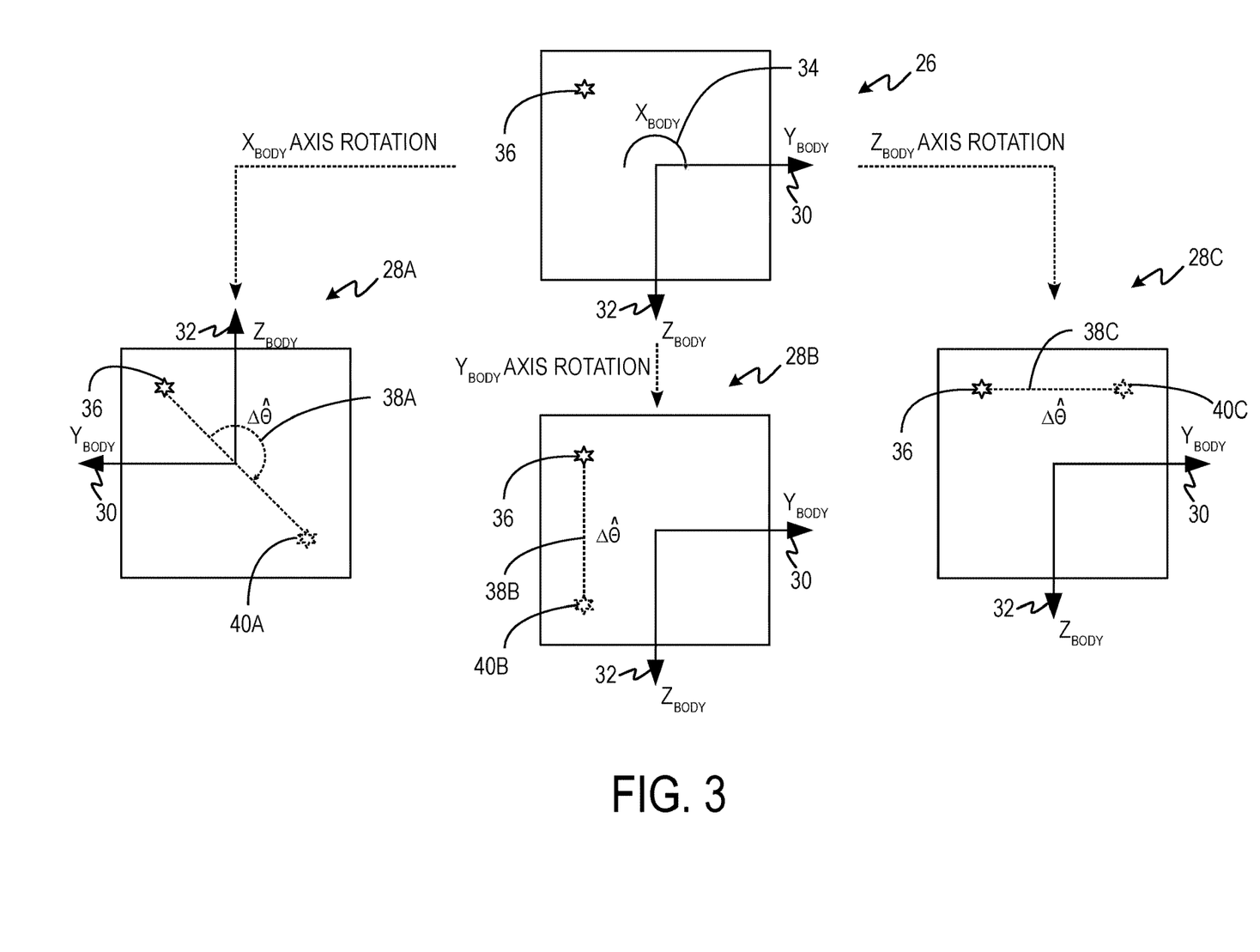
FIG. 3 illustrates three examples of a feature tracking rotation detection processes.

FIG. 3 illustrates three example feature tracking rotation detection processes including field of view field of view image 26, $X_{body}$ rotation view image 28A, $Y_{body}$ rotation view image 28B, $Z_{body}$ rotation view image 28C captured by imager device 24. Field of view field of view image 26 includes $Y_{body}$ axis 30, $Z_{body}$ axis 32, $X_{body}$ rotation 34, and one or more selected features 36. $X_{body}$ rotation view image 28A includes $Y_{body}$ axis 30, $Z_{body}$ axis 32, one or more selected features 36, rotation angle 38A, and feature initial position 40. $Y_{body}$ rotation view image 28B includes $Y_{body}$ axis 30, $Z_{body}$ axis 32, one or more selected features 36, rotation angle 38B, and feature initial position 40. $Z_{body}$ rotation view image 28C includes $Y_{body}$ axis 30, $Z_{body}$ axis 32, one or more selected features 36, rotation angle 38C, and feature initial position 40. For purposes of clarity and ease of discussion FIG. 3 is described below within the context of real-time compensation system 17 of FIG. 2.

Field of view image 26 is a first image captured at a first orientation by imager device 24. Processor(s) 18 identifies one or more selected features 36 in field of view image 26, using one or more feature selection algorithms, such as the scale-invariant feature transform (SIFT) algorithm, the affine scale invariant feature transform (ASIFT) algorithm, the fast clustering feature selection (FAST) algorithm, the speeded-up robust features (SURF) algorithm, or other feature selection algorithms. One or more selected features 36 can include lines, curves, intersections of lines, a peak in the horizon, and/or other scale-invariant landmark image features. $X_{body}$ rotation 34 indicates the direction of rotation in field of view image 26 which is along the $X_{body}$ axis of projectile 12 and orthogonal to $Y_{body}$ axis 30 and $Z_{body}$ axis 32 as shown.

Rotation view image 28A is a first example of a second image captured at a second orientation by imager device 24. Rotation angle ($\Delta\hat{\theta}$) 38A indicates the rotation of projectile 12 along the $X_{body}$ axis. As shown by one or more selected features 36, feature initial position 40, and the $Y_{body}$ axis 30 and $Z_{body}$ axis 32, rotation angle 38A is equal to 180 degrees. Processor(s) 18 is configured to determine rotation angle 38A based upon the relative position of one or more selected features 36 in field of view image 26 and rotation view image 28A.

Rotation view image 28B is a second example of a second image captured at a second orientation by imager device 24. Rotation angle ($\Delta\hat{\theta}$) 38B indicates the rotation of projectile 12 along the $Y_{body}$ axis. As shown by one or more selected features 36, feature initial position 40, and the $Y_{body}$ axis 30 and $Z_{body}$ axis 32, rotation angle 38B is less than 45 degrees. Processor(s) 18 is configured to determine rotation angle 38B based upon the relative position of one or more selected features 36 in field of view image 26 and rotation view image 28B.

Rotation view image 28C is a first example of a second image captured at a second orientation by imager device 24. Rotation angle ($\Delta\hat{\theta}$) 38C indicates the rotation of projectile 12 along the $X_{body}$ axis. As shown by one or more selected features 36, feature initial position 40, and the $Y_{body}$ axis 30 and $Z_{body}$ axis 32, orientation 38 is less than 45 degrees. Processor(s) 18 is configured to determine rotation angle 38C based upon the relative position of one or more selected features 36 in field of view image 26 and rotation view image 28C.

In one example, bias and scale factor are corrected using the described systems and methods. Angular rate sensed by gyroscope(s) 22 is subject to bias and scale factor errors, giving the equation:

$$\omega_{out,1}^{b} = k \cdot \omega_{in,1}^{b} + b_1 \quad \text{(Equation 1)}$$

where:
$\omega_{out,1}^{b}$=angular rate sensed by gyroscope(s) 22
k=scale factor error of gyroscope(s) 22
$\omega_{in,1}^{b}$=true angular rate of projectile 12, and
$b_1$=bias error of gyroscope(s) 22

The angular rate sensed by gyroscope(s) 22 is integrated over a time step, $t_1$ to $t_2$, by processor(s) 18 to give a gyroscope orientation ($\Delta\tilde{\theta}$):

$$\int_{t1}^{t2} \omega_1^b dt = \Delta\tilde{\theta}_k \quad \text{(Equation 2)}$$

where
$t_1$=the time field of view image 26 was captured, and
$t_2$=the time rotation view image 28A was captured The process of determining an orientation using imager 24 and gyroscope(s) 22 is repeated N times. In some examples, N is greater than or equal to two. The coefficients of the gyroscope compensation model are determined by least-squares fit over the defined cycle. The least-squares fit criterion is defined by:

$$J = \sum_{n=0}^{N} \left[ \Delta\hat{\theta}_n - \Delta\tilde{\theta}_n - \int_{t_{n-1}}^{t_n} \omega(b_1^g, k_1^g) \right]^2 \quad \text{(Equation 3)}$$

The above integral is defined as:

$$\int_{t_{n-1}}^{t_n} \omega_1^b dt = k_1 \cdot \Delta\hat{\theta}_n + b_1(t_n - t_{n-1}) \quad \text{(Equation 4)}$$

Altering and condensing notation gives the least-squares standard form as:

$$J=\sum_{n=0}^{N}[y_n-(p_1 x_n^{(1)}+p_2 x_n^{(2)})]^2 \quad \text{(Equation 5)}$$

where:

n=number of accumulation interval $\Delta\hat{\theta}_n$=reference (seeker) incremental angle over $n^{th}$ accumulation interval $\Delta\tilde{\theta}_n$=gyroscope-derived incremental angle over $n^{th}$ accumulation interval $\omega_1^b$=gyroscope output (rate) of axis 1

$t_n=\Delta\hat{\theta}_n-\Delta\tilde{\theta}_n$ $p_1=b_1^g$, gyroscope bias of axis 1

$p_2=k_1^g$, gyroscope scale factor axis 1

$x_n^{(1)}=t_n-t_{n-1}$, time delta of accumulation interval, n $x_n^{(2)}=\Delta\tilde{\theta}_n$, J=least squares cost function  (Equation 6)

The least squares fit to the data simplifies to the matrix form of:

$$\begin{bmatrix} \sum_{n=0}^{N} x_n^{(1)} x_n^{(1)} & \sum_{n=0}^{N} x_n^{(2)} x_n^{(1)} \\ \sum_{n=0}^{N} x_n^{(1)} x_n^{(2)} & \sum_{n=0}^{N} x_n^{(2)} x_n^{(2)} \end{bmatrix} \begin{bmatrix} p_1 \\ p_2 \end{bmatrix} = \begin{bmatrix} \sum_{n=0}^{N} y_n x_n^{(1)} \\ \sum_{n=0}^{N} y_n x_n^{(2)} \end{bmatrix} \quad \text{(Equation 7)}$$

Noting that the leading matrix has the form $G^TG$, the above equation simplifies to:

$$(G^TG)P=G^TY \quad \text{(Equation 8)}$$

or:

$$\begin{bmatrix} x_1^{(1)} & x_2^{(1)} & \cdots & x_N^{(1)} \\ x_1^{(2)} & x_2^{(2)} & \cdots & x_N^{(2)} \end{bmatrix} \begin{bmatrix} x_1^{(1)} & x_1^{(2)} \\ x_2^{(1)} & x_2^{(2)} \\ \vdots & \vdots \\ x_N^{(1)} & x_N^{(2)} \end{bmatrix} \begin{bmatrix} p_1 \\ p_2 \end{bmatrix} = \begin{bmatrix} x_1^{(1)} & x_2^{(1)} & \cdots & x_N^{(1)} \\ x_1^{(2)} & x_2^{(2)} & \cdots & x_N^{(2)} \end{bmatrix} \begin{bmatrix} y_1 \\ y_2 \\ \vdots \\ y_N \end{bmatrix} \quad \text{(Equation 9)}$$

Resubstituting in the original values and solving for the bias ($b_1^g$) and scale factor ($k_1^g$) leaves $$\begin{bmatrix} b_1^g \\ k_1^g \end{bmatrix} = (G^TG)^{-1}G^T \begin{bmatrix} \Delta\hat{\theta}_1 - \Delta\tilde{\theta}_1 \\ \Delta\hat{\theta}_2 - \Delta\tilde{\theta}_2 \\ \vdots \\ \Delta\hat{\theta}_N - \Delta\tilde{\theta}_N \end{bmatrix}, \text{ where } G = \begin{bmatrix} t_2-t_1 & \Delta\hat{\theta}_1 \\ t_3-t_2 & \Delta\hat{\theta}_2 \\ \vdots & \vdots \\ t_N-t_{N-1} & \Delta\hat{\theta}_N \end{bmatrix} \quad \text{(Equation 10)}$$

The bias and scale factor compensation parameters are determined in Equation 10. This gives the compensated gyroscope output ($\omega_{comp,1}^b$):

$$\omega_{comp,1}^b = \frac{\omega_{out,1}^b - b_1^g}{k_1^g} \quad \text{(Equation 11)}$$

Figure 4:
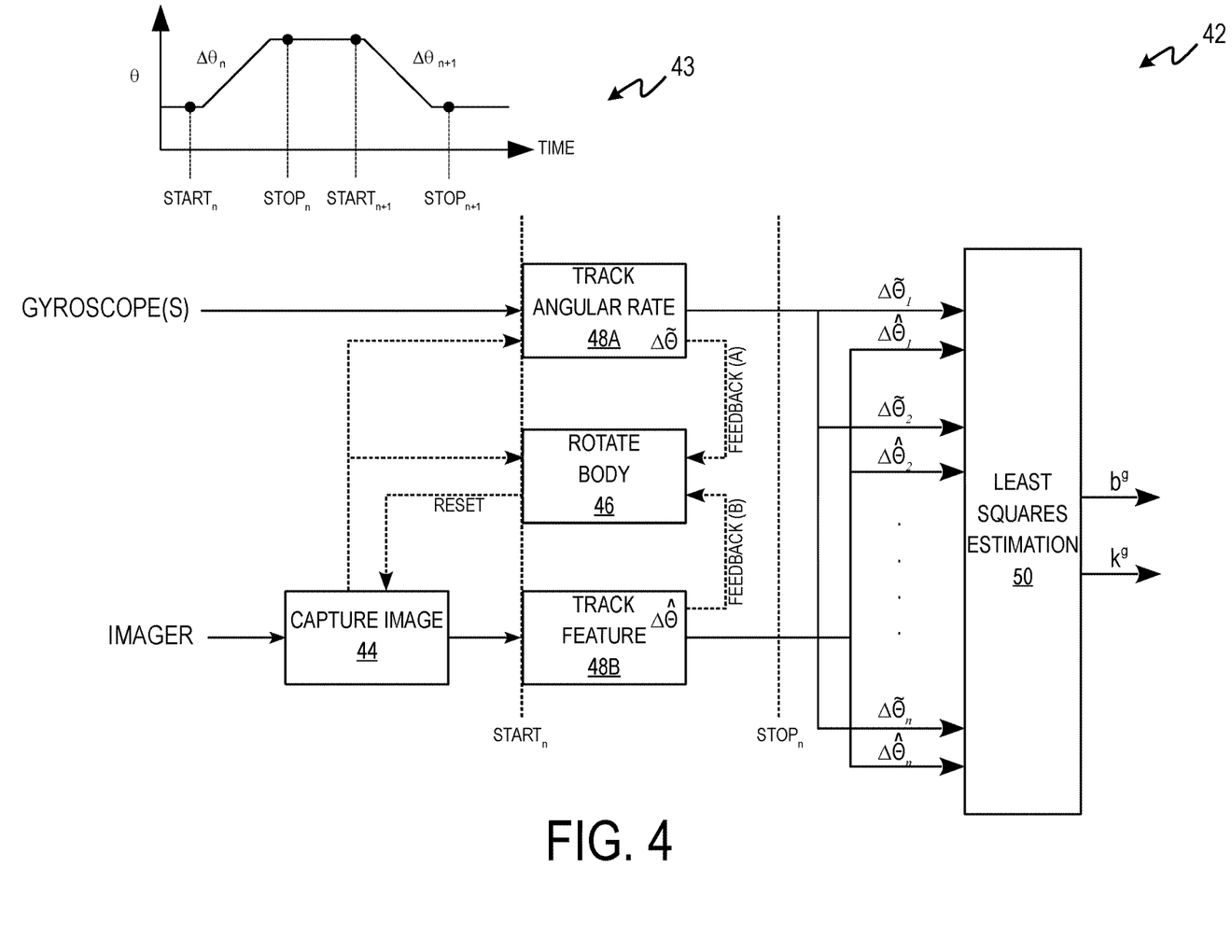
FIG. 4 is a functional diagram of a real-time compensation process.

FIG. 4 is functional diagram 42 depicting projectile orientation graph 43, capture image sub-process 44, rotate body sub-process 46, track angular rate sub-process 48A, track feature rotation detector sub-process 48B, least squares estimation sub-process 50, and data flow of a real-time compensation process. For purposes of clarity and ease of discussion, functional diagram 42 is described below within the context of real-time compensation system 17 of FIG. 2 and the feature tracking rotation detection processes of FIG. 3.

At capture image sub-process 44, imager device 24 captures an image at a first orientation. Image data of the image can be stored in memory 19 or in memory of imager device 24 to be used in feature detection and tracking. Feature 36 is detected in field of view image 26 using processor(s) 18. In response to feature 36 being detected, rotate body sub-process 46, track angular rate sub-process 48A, and track feature rotation detector sub-process 48B begin. Rotate body sub-process 46, track angular rate sub-process 48A, and track feature rotation detector sub-process 48B occur concurrently. At rotate body sub-process 46, projectile 12 is rotated about either $X_{body}$ axis, $Y_{body}$ axis 30, or $Z_{body}$ axis 32 using flight controller 20 the first orientation to a second orientation. In one example, projectile 12 is brought to a zero-rotation rate prior to rotating from the first orientation to the second orientation through a rotation angle. A zero-rotation rate is a state in which projectile 12 is not rotating about any of its three axes. In one example, projectile 12 is rotated between the first orientation and the second orientation. Flight controller 20 receives feedback from track angular rate sub-process 48A in the form of rotation angle $\Delta\tilde{\theta}$ and/or track feature rotation detector sub-process 48B in the form of rotation angle $\Delta\hat{\theta}$. Flight controller 20 determines the second orientation has been reached based upon the feedback from track angular rate sub-processes 48A and/or track feature rotation detector sub-process 48B.

Track angular rate sub-process 48A tracks the sensed angular rate provided by gyroscope(s) 22. The sensed angular rate is integrated over a time step using processor(s) 18 to provide rotation angle $\Delta\tilde{\theta}$. The time step is the time of rotation beginning from the first orientation to the time $\Delta\tilde{\theta}$ is being determined. When the second orientation is reached the time step is the time of rotation from the first orientation to the second orientation which gives $\Delta\tilde{\theta}_n$. The track feature rotation detector sub-process 48B tracks the movement of feature 36 within the field of view of projectile 12. In some examples, imager device 24 captures multiple images as projectile 12 rotates from the first orientation to the second orientation. This allows processor(s) 18 to track the movement of feature 36 as projectile 12 rotates and verify the rotation is along a single axis. In some examples, a second image is captured by imager device 24 when the second orientation is reached based upon rotation angle $\Delta\hat{\theta}$, and rotation angle $\Delta\hat{\theta}_n$ is determined by processor(s) 18 based upon the relative position of feature 36 in the first image and the second image. In one example, the multiple images allow processor(s) 18 to verify a conical rotation through $Y_{body}$ axis 30 and $Z_{body}$ axis 32. Conical rotation allows real-time compensation of $Y_{body}$ axis 30 and $Z_{body}$ axis 32 simultaneously. In a further example, projectile 12 is rotated through $X_{body}$ axis, $Y_{body}$ axis 30, and $Z_{body}$ axis 32 simultaneously allowing simultaneous real-time compensation of $X_{body}$ axis, $Y_{body}$ axis 30, and $Z_{body}$ axis 32.

When rotate body sub-process 46 has reached the second orientation, track angular rate sub-process 48A has determined rotation angle $\Delta\tilde{\theta}_n$, and track feature rotation detector sub-process 48B has determined rotation angle $\Delta\hat{\theta}_n$, rotation angles $\Delta\tilde{\theta}_n$ and $\Delta\hat{\theta}_n$ are stored in memory 19 for least square estimation sub-process 50. Once rotation angles $\Delta\tilde{\theta}_n$ and $\Delta\hat{\theta}_n$ are stored, the process goes back to image capture sub-process 44 to gather additional rotation angles $\Delta\tilde{\theta}_n$ and $\Delta\hat{\theta}_n$ until the process has been repeated N times. Projectile rotation graph 43 depicts one example of the process being done twice to determine $\Delta\tilde{\theta}_n$, $\Delta\hat{\theta}_n$, $\Delta\tilde{\theta}_{n+1}$, and $\Delta\hat{\theta}_{n+1}$. Graph 43 depicts the orientation ($\theta$) of projectile 12 over time. Graph 43 also shows the start and stop times for determining $\Delta\tilde{\theta}_n$, $\Delta\hat{\theta}_n$, $\Delta\tilde{\theta}_{n+1}$, and $\Delta\hat{\theta}_{n+1}$. After repeating the process N times, least squares estimation process uses rotation angles $\Delta\tilde{\theta}_1$–$\Delta\tilde{\theta}_N$ and $\Delta\hat{\theta}_1$–$\Delta\hat{\theta}_N$ to determine a least squares fit for one or more gyroscope parameters such as gyroscope bias ($b^g$) and gyroscope scale factor ($k^g$) as described above with respect to FIG. 3. The process is then stopped and gyroscope(s) 22 is compensated using the determined one or more gyroscope compensation parameters. This process can be repeated for any number of gyroscopes present on projectile 12. In one example, compensating the gyroscope includes calibrating the gyroscope based upon differences between the rotation angles $\Delta\tilde{\theta}_n$ and $\Delta\hat{\theta}_n$.

Accordingly, implementing techniques of this disclosure, real-time compensation of inertial gyroscopes can be used to maintain accurate projectile flight in GPS denied areas while using low cost IMUs. Using real-time compensation of inertial gyroscopes as described herein, changes in gyroscope error due to launch or during flight can be adjusted without using GPS. This improves projectile attitude estimates and acquisition capabilities in lower cost projectiles.

Discussion of Possible Embodiments

The following are non-exclusive descriptions of possible embodiments of the present invention.

A real-time compensation system of a projectile can comprise at least one flight controller configured to rotate the projectile about an axis between a first orientation and a second orientation through an angle; at least one imager device configured to capture a first image at the first orientation and a second image at the second orientation; at least one gyroscope configured to sense a first angular rate of the projectile as the projectile rotates from the first orientation to the second orientation; and at least one processor configured to detect a feature in the first image, determine a first rotation angle based upon relative positions of the feature in the first and second images, determine a second rotation angle based upon the angular rate sensed by the at least one gyroscope, and determine a gyroscope compensation parameter based upon the first and second rotation angle.

The real-time compensation system of the preceding paragraph can optionally include, additionally and/or alternatively, any one or more of the following features, configurations and/or additional components:

The at least one flight controller can be further configured to rotate the projectile about the axis from the second orientation to a third orientation; the at least one imager device can be further configured to capture a third image; the at least one gyroscope can be further configured to sense a second angular rate using the at least one gyroscope while the projectile rotates from the second orientation to the third orientation; and the at least one processor can be further configured to determine a third rotation angle based upon relative positions of the feature in the second and third images, determine a fourth rotation angle based upon the angular rate sensed by the at least one gyroscope, and determine the gyroscope compensation parameter based upon the first, second, third, and fourth rotation angle.

The processor can be configured to determine the gyroscope compensation parameter by applying a least-squares methodology to the first, second, third, and fourth rotation angle.

The processor can be further configured to adjust the angular rate sensed by the at least one gyroscope based upon the gyroscope compensation parameter.

Rotating the projectile about the axis can comprise rotating the projectile about at least two axes.

The second rotation angle can be determined by integrating the sensed angular rate over a time step.

The at least one imager device can be further configured to capture multiple images in addition to the first and second image as the projectile rotates from the first orientation to the second orientation and track the movement of the feature throughout the multiple images; and the at least one processor can be further configured to determine the first rotation angle based upon the relative position of the feature in the first and second images and the tracked movement of the feature throughout the multiple images.

The processor can be further configured to determine the second orientation has been reached based upon the tracked movement of the feature throughout the multiple images.

The flight controller can be further configured to bring the projectile to a zero-rotation rate state prior to rotating the projectile about an axis.

The processor can be configured to determine first rotation angle based upon the relative position of the first and second image using scale-invariant feature transform.

A method can comprise rotating a projectile about an axis from a first orientation to a second orientation using a flight controller; capturing a first image at the first orientation using an imager device of the projectile; detecting a feature in the first image using a processor; capturing a second image at the second orientation using the imager device; determining a first rotation angle based upon a relative position of the feature in the first and second images using a processor; sensing a first angular rate using at least one gyroscope while the projectile rotates from the first orientation to the second orientation; determining a second rotation angle based upon the angular rate sensed by the at least one gyroscope; and determining a gyroscope compensation parameter for the at least one gyroscope can be based upon the first and second rotation angle.

The method of the preceding paragraph can optionally include, additionally and/or alternatively, any one or more of the following features, configurations and/or additional components:

Rotating the projectile about the axis from the second orientation to a third orientation using the flight controller; capturing a third image using the imager device; determining a third rotation angle can be based upon the relative position of the feature in the second and third images using a processor; sensing an angular rate using the at least one gyroscope while the projectile rotates from the second orientation to the third orientation; determining a fourth rotation angle can be based upon the angular rate sensed by the at least one gyroscope; and wherein in determining the gyroscope compensation parameter can be further based upon the third and fourth rotation angle.

Determining the gyroscope compensation parameter can comprise applying a least-squares methodology to the first, second, third, and fourth rotation angle using the at least one processor.

Adjusting the angular rate sensed by the at least one gyroscope can be based upon the gyroscope compensation parameter using the at least one processor.

Rotating the projectile about the axis can further comprise rotating the projectile about at least two axes using the at least one flight controller.

Determining the second rotation angle can comprise integrating the sensed angular rate over a time step.

Capturing multiple images in addition to the first and second image as the projectile rotates from the first orientation to the second orientation using the at least one imager device; and tracking the movement of the feature throughout the multiple images using the at least one processor; and wherein determining the first rotation angle can be further based upon the tracked movement of the feature throughout the multiple images.

Determining the second orientation has been reached can be based upon the tracked movement of the feature throughout the multiple images using the at least one processor.

Bringing the projectile to a zero-rotation rate state prior to rotating the projectile about an axis using the at least one flight controller.

Determining first rotation angle can be based upon the relative position of the first and second image by a scale-invariant feature transform using the at least one processor.

A method of in-flight calibration for a projectile can comprise rotating the projectile between at least a first orientation and a second orientation about at least one axis; capturing a plurality of images of a field of view of an imager device on board the projectile during the rotating including at least a first image taken at the first orientation and a second image taken at the second orientation; measuring a measured angle between the first image and the second image; monitoring an angular rate of the projectile with at least one gyroscope during the rotating; calculating a calculated angle between the first orientation and the second orientation with data monitored by the at least one gyroscope; and calibrating data monitored by the at least one gyroscope based on differences between the calculated angle and the measured angle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A real-time compensation system of a projectile comprising:
    at least one flight controller configured to rotate the projectile about an axis from a first orientation to a second orientation through an angle;
    at least one imager device configured to capture a first image at the first orientation and a second image at the second orientation;
    at least one gyroscope configured to sense a first angular rate of the projectile as the projectile rotates between the first orientation and the second orientation; and
    at least one processor configured to detect a feature in the first image, determine a first rotation angle based upon relative positions of the feature in the first and second images, determine a second rotation angle based upon the angular rate sensed by the at least one gyroscope, and determine a gyroscope compensation parameter based upon the first and second rotation angle.

2. The system of claim 1, wherein:
    the at least one flight controller is further configured to rotate the projectile about the axis from the second orientation to a third orientation;
    the at least one imager device is further configured to capture a third image;
    the at least one gyroscope is further configured to sense a second angular rate using the at least one gyroscope while the projectile rotates from the second orientation to the third orientation; and
    the at least one processor is further configured to determine a third rotation angle based upon relative positions of the feature in the second and third images, determine a fourth rotation angle based upon the angular rate sensed by the at least one gyroscope, and determine the gyroscope compensation parameter based upon the first, second, third, and fourth rotation angle.

3. The system of claim 2, wherein the processor is configured to determine the gyroscope compensation parameter by applying a least-squares methodology to the first, second, third, and fourth rotation angle.

4. The system of claim 1, wherein the processor is further configured to adjust the angular rate sensed by the at least one gyroscope based upon the gyroscope compensation parameter.

5. The system of claim 1, wherein rotating the projectile about the axis comprises rotating the projectile about at least two axes.

6. The system of claim 1, wherein the second rotation angle is determined by integrating the sensed angular rate over a time step.

7. The system of claim 1, wherein:
    the at least one imager device is further configured to capture multiple images in addition to the first and second image as the projectile rotates from the first orientation to the second orientation and track the movement of the feature throughout the multiple images; and
    the at least one processor is further configured to determine the first rotation angle based upon the relative position of the feature in the first and second images and the tracked movement of the feature throughout the multiple images.

8. The system of claim 7, wherein the processor is further configured to determine the second orientation has been reached based upon the tracked movement of the feature throughout the multiple images.

9. The system of claim 1, wherein the flight controller is further configured to bring the projectile to a zero-rotation rate state prior to rotating the projectile about an axis.

10. The system of claim 1, the processor is configured to determine first rotation angle based upon the relative position of the first and second image using scale-invariant feature transform.

11. A method comprising:
rotating a projectile about an axis from a first orientation to a second orientation using a flight controller;
capturing a first image at the first orientation using an imager device of the projectile;
detecting a feature in the first image using a processor;
capturing a second image at the second orientation using the imager device;
determining a first rotation angle based upon a relative position of the feature in the first and second images using a processor;
sensing a first angular rate using at least one gyroscope while the projectile rotates from the first orientation to the second orientation;
determining a second rotation angle based upon the angular rate sensed by the at least one gyroscope; and
determining a gyroscope compensation parameter for the at least one gyroscope based upon the first and second rotation angle.

12. The method of claim 11, further comprising:
rotating the projectile about the axis from the second orientation to a third orientation using the flight controller;
capturing a third image using the imager device;
determining a third rotation angle based upon the relative position of the feature in the second and third images using a processor;
sensing an angular rate using the at least one gyroscope while the projectile rotates from the second orientation to the third orientation;
determining a fourth rotation angle based upon the angular rate sensed by the at least one gyroscope; and
wherein in determining the gyroscope compensation parameter is further based upon the third and fourth rotation angle.

13. The method of claim 12, determining the gyroscope compensation parameter comprises applying a least-squares methodology to the first, second, third, and fourth rotation angle using the at least one processor.

14. The method of claim 11, further comprising adjusting the angular rate sensed by the at least one gyroscope based upon the gyroscope compensation parameter using the at least one processor.

15. The method of claim 11, wherein rotating the projectile about the axis further comprises rotating the projectile about at least two axes using the at least one flight controller.

16. The method of claim 11, wherein determining the second rotation angle comprises integrating the sensed angular rate over a time step.

17. The method of claim 11, further comprising:
capturing multiple images in addition to the first and second image as the projectile rotates from the first orientation to the second orientation using the at least one imager device; and
tracking the movement of the feature throughout the multiple images using the at least one processor; and
wherein determining the first rotation angle is further based upon the tracked movement of the feature throughout the multiple images.

18. The method of claim 17, further comprises determining the second orientation has been reached based upon the tracked movement of the feature throughout the multiple images using the at least one processor.

19. The method of claim 11, further comprising bringing the projectile to a zero-rotation rate state prior to rotating the projectile about an axis using the at least one flight controller.

20. A method of in-flight calibration for a projectile comprising:
rotating the projectile between at least a first orientation and a second orientation about at least one axis;
capturing a plurality of images of a field of view of an imager device on board the projectile during the rotating including at least a first image taken at the first orientation and a second image taken at the second orientation;
measuring a measured angle between the first image and the second image;
monitoring an angular rate of the projectile with at least one gyroscope during the rotating;
calculating a calculated angle between the first orientation and the second orientation with data monitored by the at least one gyroscope; and
calibrating data monitored by the at least one gyroscope based on differences between the calculated angle and the measured angle.

* * * * *